US007274967B2

(12) United States Patent
Tico et al.

(10) Patent No.: US 7,274,967 B2
(45) Date of Patent: Sep. 25, 2007

(54) SUPPORT OF A WAVETABLE BASED SOUND SYNTHESIS IN A MULTIPROCESSOR ENVIRONMENT

(75) Inventors: Marius Tico, Tampere (FI); Jarno Seppanen, Helsinki (FI); Matti S. Hamalainen, Lempäälä (FI)

(73) Assignee: Nokia Corporation, Espoo (FI)

( * ) Notice: Subject to any disclaimer, the term of this patent is extended or adjusted under 35 U.S.C. 154(b) by 832 days.

(21) Appl. No.: 10/684,339

(22) Filed: Oct. 10, 2003

(65) Prior Publication Data

US 2005/0080498 A1 Apr. 14, 2005

(51) Int. Cl.
*G06F 17/00* (2006.01)

(52) U.S. Cl. .......................................... 700/94; 84/604

(58) Field of Classification Search .................. 84/604, 84/605, 606, 607; 709/232; 710/29
See application file for complete search history.

(56) References Cited

U.S. PATENT DOCUMENTS 5,698,802 A * 12/1997 Kamiya ....................... 84/604
5,761,434 A * 6/1998 Hewitt ....................... 709/231
5,763,801 A * 6/1998 Gulick ....................... 84/604
5,847,304 A * 12/1998 Hewitt ....................... 84/622
5,895,469 A * 4/1999 Lahti et al. ................... 710/52
6,040,515 A * 3/2000 Mukojima et al. ............ 84/603
6,100,461 A 8/2000 Hewitt
6,134,607 A * 10/2000 Frink ......................... 710/22
6,715,007 B1 * 3/2004 Williams et al. .............. 710/52
2002/0134222 A1 * 9/2002 Tamura ....................... 84/622

* cited by examiner

*Primary Examiner*—Sinh Tran
*Assistant Examiner*—Joseph Saunders, Jr.

(57) ABSTRACT

The invention relates to methods for use in a wavetable based sound synthesis, wherein a first processor stores wavetable data and wherein a second processor generates an output audio signal frame-by-frame based on samples of the wavetable data. One method comprises at the first processor selecting samples of the stored wavetable data, which are expected to be required at the most at the second processor for generating a next output audio frame. The selection is based on a model of a pitch-shift evolution during a single frame and on the number of samples which have been used so far by the second processor. The selected samples are made available to the second processor. Another method allows the second processor to make use of the provided samples. The invention relates equally to corresponding processors, to a corresponding wavetable based sound synthesis system, to a corresponding device and to corresponding software program products.

21 Claims, 8 Drawing Sheets

SUPPORT OF A WAVETABLE BASED SOUND SYNTHESIS IN A MULTIPROCESSOR ENVIRONMENT

FIELD OF THE INVENTION

The invention relates to the field of wavetable based sound synthesis and more specifically to methods for use in a wavetable based sound synthesis, wherein a first processor stores wavetable data and wherein a second processor generates an output audio signal frame-by-frame based on samples of this wavetable data. The invention relates equally to corresponding processors, to a corresponding wavetable based sound synthesis system, to a corresponding device and to corresponding software program products.

BACKGROUND OF THE INVENTION

Wavetable based sound synthesis is a popular sound synthesis for use in mobile telecommunication terminals. It has the advantage that a very high sound synthesis quality is achieved with a rather simple algorithm, which basically relies on processing and playing back previously recorded audio samples, called wavetables.

For the purpose of the music synthesis, the wavetables store the tones of real instruments that are recorded under different conditions, for instance using different pitches or musical notes, different note velocities, etc. Before the wavetables are actually included into the output audio sound, the raw wavetable data undergoes several signal processing operations, including decimation and interpolation for the purpose of pitch shifting the original note, amplitude modulation for the purpose of modeling the envelope of the output audio waveform, filtering, etc.

A signal processing operation that is extensively used in wavetable based sound synthesis is synchronous pitch-shifting. This operation is performed in order to modify the pitch of the recorded wavetable, which allows to synthesize higher or lower musical notes or tones. Basically, the operation is carried out by resampling the wavetable data by decimation and/or interpolation procedures, such that the pitch is increased or decreased without changing the output sampling rate. For instance, playing only every second sample from the wavetable data would caused a pitch increase by one octave and a reduction of the number of samples by half. In general, any pitch-shifting operation will alter the number of samples in the signal.

Modern mobile telecommunication terminals provide specific architectural features that should be exploited by any practical implementation of a wavetable sound synthesis. Often a terminal contains more than one processor. For instance, the terminal may comprise a micro controller unit (MCU) as main processor, as well as additionally one or more dedicated coprocessors. An example of such dedicated coprocessor is a digital signal processor (DSP) that is the preferred tool to perform computationally intensive operations characteristic to signal processing tasks.

In several hardware architectures, the size of the memory space addressable by different processors is different, and it might not always be possible to store the entire wavetable data in the memory space which is addressable by the very processor that is going to process it, for example the DSP. In such architectures, it might be necessary to store the wavetable data in a memory space which is addressable by some other processor, for example the MCU. The MCU then has to transfer the wavetable data to the DSP during playback. A technological solution for inter-processor communication consists in using a memory space addressable by both processors, called shared memory. Thus, taking care of avoiding conflicts, each processor can be allowed to access the shared memory at certain moments, in order to write data for the other processor, or to read data that was previously written for it by the other processor.

A known approach of implementing a wavetable based sound synthesis on such a multiprocessor architecture is to copy the entire wavetable data which is needed by all active voices from an MCU memory into a DSP memory for processing and playback.

Due to DSP memory limitations, such an approach can only be used for small polyphony synthesis, since the larger the number of active voices the higher the memory requirements for the DSP. In addition, very long wavetable data might also be difficult to utilize, since the size of a very long single wavetable might approach or even exceed the available DSP memory space. Summarized, the available DSP memory space might be insufficient to accommodate the entire wavetable data needed to produce a desired audio output.

The same problem may arise in any other wavetable based sound synthesis system having a first processor with sufficient memory space for storing the wavetable data and a second processor with sufficient computational power for processing the wavetable data.

In U.S. Pat. No. 6,100,461 A, a wavetable based sound synthesis system is described, in which wavetable data having a modified wavetable structure is transmitted in bursts from a memory to a wavetable audio synthesis device. In order to achieve an efficient transmission on a Peripheral Component Interconnect (PCI) bus, the data voice samples, that are 8 or 16 bits in length, are organized in units of 32-bits called frames. The group of samples transmitted in one burst comprises several such frames of data for a voice. It is assumed that the wavetable audio synthesis device has access to the main memory space where the entire wavetable data is stored, and that the data transfers between the main memory and the device can be carried out without involving the main processor of the host machine. As mentioned above, however, such a wavetable audio synthesis device is not always able to keep the entire wavetable data in the memory space that it is able to address, and hence an alternative solution is needed.

SUMMARY OF THE INVENTION

The invention provides an alternative to known approaches for wavetable sound synthesis. It provides in particular a possibility of implementing a wavetable sound synthesis making use of two processors, where a first processor is equipped with sufficient memory space to store the wavetable data, but insufficient computational power to process it, and where a second processor has the computational power to process the data for wavetable sound synthesis, but has insufficient memory space to store the raw wavetable data.

Two methods for use in a wavetable based sound synthesis are proposed, wherein a first processor stores wavetable data and wherein a second processor generates at least an output audio signal frame-by-frame based on samples of the wavetable data.

The first proposed method comprises at the first processor selecting those samples of the stored wavetable data, which are expected to be required at the most at the second processor for generating a respective next output audio frame. The selection is based on a given model of a pitch-shift evolution during a single frame and on the number of samples which have been used so far by the second processor during a generation of preceding audio frames. The first proposed method further comprises at the first processor making the selected samples available to the second processor.

The second proposed method comprises at the second processor receiving samples of the stored wavetable data for a $k^{th}$ output audio frame which is to be generated next, with k greater than 0, the samples being made available by the first processor. The second proposed method further comprises at the second processor determining an index $I_k$ identifying a first sample among the received samples which has not been used for generating a $(k-1)^{th}$ output audio frame. The second proposed method further comprises at the second processor processing the received samples, beginning with the first sample identified by the determined index $I_k$, for generating the $k^{th}$ output audio frame. Finally, the second proposed method comprises at the second processor making the number $K_k$ of samples required in generating the $k^{th}$ output audio frame available to the first processor. It is to be noted that for the first output audio frame, the index $I_k$ is determined to be zero, as no preceding output audio frame exists, and thus no samples have been used for generating such a preceding frame.

In addition, a first processor providing wavetable data for a wavetable based sound synthesis to another processor is proposed, which processor comprises a memory for storing wavetable data and a processing component selecting those samples of the stored wavetable data, which are expected to be required at the most at the other processor for generating a respective next output audio frame. The selection is based on a given model of a pitch-shift evolution during a single frame and on the number of samples which have been used so far by the other processor during a generation of preceding audio frames. The processing component further makes the selected samples available to the other processor.

In addition, a wavetable based sound synthesis system and a device are proposed, either comprising the proposed first processor and a second processor. The second processor includes in both cases a memory for storing samples of wavetable data made available by the first processor and a processing component generating at least an output audio frame by processing samples from the memory of the second processor.

Moreover, a separate second processor for generating at least an output audio signal frame-by-frame based on samples of wavetable data is proposed. The second proposed processor comprises a processing component, which receives samples of the wavetable data for a $k^{th}$ output audio frame which is to be generated next, with k greater than 0, the samples being made available by a first processor. The processing component further determines an index $I_k$ identifying a first sample among the received samples which has not been used for generating a $(k-1)^{th}$ output audio frame. The processing component further processes the received samples, beginning with the first sample identified by the determined index $I_k$, for generating the $k^{th}$ output audio frame. The processing component further makes the number $K_k$ of samples required in generating the $k^{th}$ output audio frame available to the other processor.

Moreover, a first software program product is proposed, in which a software code for supporting a wavetable based sound synthesis is stored. When running in a processing component of a processor storing wavetable data, the software code selects samples of the stored wavetable data, which samples are expected to be required at the most at another processor for generating a respective next output audio frame. The selection is based on a given model of a pitch-shift evolution during a single frame and on the number of samples which have been used so far by the other processor during a generation of preceding audio frames. The software code further makes the selected samples available to the other processor.

Finally, a second software program product is proposed, in which a software code for supporting a wavetable based sound synthesis is stored. When running in a processing component of a processor for generating at least an output audio signal frame-by-frame based on received samples of wavetable data, the software code determines an index $I_k$ identifying a first sample among received samples, which first sample has not been used for generating a $(k-1)^{th}$ output audio frame, wherein the received samples are samples of the wavetable data for a $k^{th}$ output audio frame which is to be generated next, with k greater than 0. The software code further processes the received samples, beginning with the first sample identified by the determined index $I_k$, for generating the $k^{th}$ output audio frame. The software code further makes the number $K_k$ of samples required in generating the $k^{th}$ output audio frame available to another processor providing the received samples.

The invention proceeds from the idea that a real-time streaming of wavetable data between two processors can be enabled. It is therefore proposed that the entire wavetable data is stored in a first processor comprising a sufficiently large memory, and that basically only those data samples that are required at a time during the playback are transmitted to a second processor, in which the samples may undergo further processing and eventually contribute to the output generated sound. The wavetable data is thus stored in a memory space addressable only by the first processor and transferred to the second processor in short pieces, for real-time processing during playback.

The second processor will usually calculate and deliver to the audio output a certain number of audio samples at fixed time intervals. The audio samples delivered at each time interval form a frame. The second processor thus has to meet periodic deadlines at which it must deliver a frame of output audio samples for playback. The frames have a constant time duration and comprise therefore the same number of output audio samples each. On the one hand, a large frame duration would be preferable in order to reduce the effect of possible latencies in the first processor, to increase the efficiency by reducing the number of function calls in a software program for wavetable synthesis and to reduce the number of block data transfers per unit of time between the two processors. On the other hand, the frame size must be limited to an acceptable value such that the required data fits into the memory which is directly addressable by the second processor.

A difficulty arises from the fact that the number of raw wavetable samples required by the second processor to calculate the respective next output audio frame is not known in advance at the first processor. This is due to the fact that the amount of a pitch-shift, which has to be applied by the second processor to the raw wavetable samples for generating the desired audio signal, is calculated by the second processor only during the preparation of the output audio frame. The number of required samples is moreover often changing from one frame to another according to different real-time musical controls. The amount of pitch-shift does not even have to be constant for the duration of a single output audio frame. Often, its instantaneous value is changed during the frame duration due to musical effects, like vibrato, that are simulated by the second processor in real time. It is to be noted that it would be extremely inefficient to simulate the pitch-shift computations at the first processor beforehand, in order to determine how many samples the second processor will need for generating the next audio frame.

It is therefore proposed in addition that the first processor predicts the wavetable samples which the second processor will need to prepare the respective next audio frame, and sends a number of samples that is expected to cover the needs of the second processor.

If this number of samples is underestimated by the first processor, the raw wavetable data transferred to the second processor will turn out to be insufficient for calculating an entire output frame. On the other hand, if the number of wavetable samples needed by the second processor is overestimated, then it may happen for the first processor to advance too fast through the wavetable data in comparison to the second processor. In such a case, the second processor may be forced to jump over portions of the wavetable data for which it did not have time for processing.

It is therefore proposed more specifically that the first processor predicts the required samples for a respective next frame based on a given model of the pitch-shift evolution during one audio frame and on the number of samples the second processor needed for the preparation of preceding output audio frames.

The second processor should be able to synthesize output audio frames based on the wavetable samples provided by the first processor.

It is an advantage of the invention that it allows to reduce the memory requirements in the second processor significantly, since only an amount of samples somewhat larger than the amount required for one frame has to be stored at a time by the second processor. Alternatively or in addition, the invention allows for the same reason a much higher polyphony. Further, it allows the use of wavetable data of any size.

The invention can be easily adapted to a use with any model for the pitch-shift variation during one frame.

In an embodiment of the invention, the first and the second processor communicate through a shared memory space in which one processor allows to write data for the other processor and to read data previously written there by the other processor. In this case, the first processor provides the samples selected for the next frame to the second processor by writing them into the shared memory space, and the second processor reads the samples from the shared memory at an appropriate point of time. The second processor further records in this case the number $K_k$ of samples required in generating the $k^{th}$ output audio frame into the shared memory for making it available to the first processor. The proposed software code copies in this case the selected samples directly into the shared memory, from where they can be fetched by the first processor at an appropriate moment.

The samples for one frame can be provided by the first processor in particular in one block per frame.

The data transfer from a shared memory to the memory addressable only by the second processor can be efficiently carried out as a single data block transfer per frame by taking advantage of a direct memory access (DMA) transfer, if available.

It is of importance to note that although the present invention describes in detail the problems related with streaming wavetable data for a single voice, it can be easily extrapolated to a plurality of voices. Thus, any block of data transferred from the first processor to the second processor may include the necessary wavetable data samples needed by all active voices rather than by a single voice, reducing thereby the number of such block data transfers to one per frame.

The invention can be implemented in software or in hardware. The invention can further be embedded into any wavetable based sound synthesizing system that is operating on a split processor architecture. The processors can be in particular, though not exclusively, an MCU storing the wavetable data and a DSP generating the output audio signal. The device can be in particular, though not exclusively, a mobile telecommunication terminal. The system can be, for example, equally a mobile telecommunication terminal or part of a mobile telecommunication terminal or an assembly of several components or devices.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE INVENTION

Figure 1:
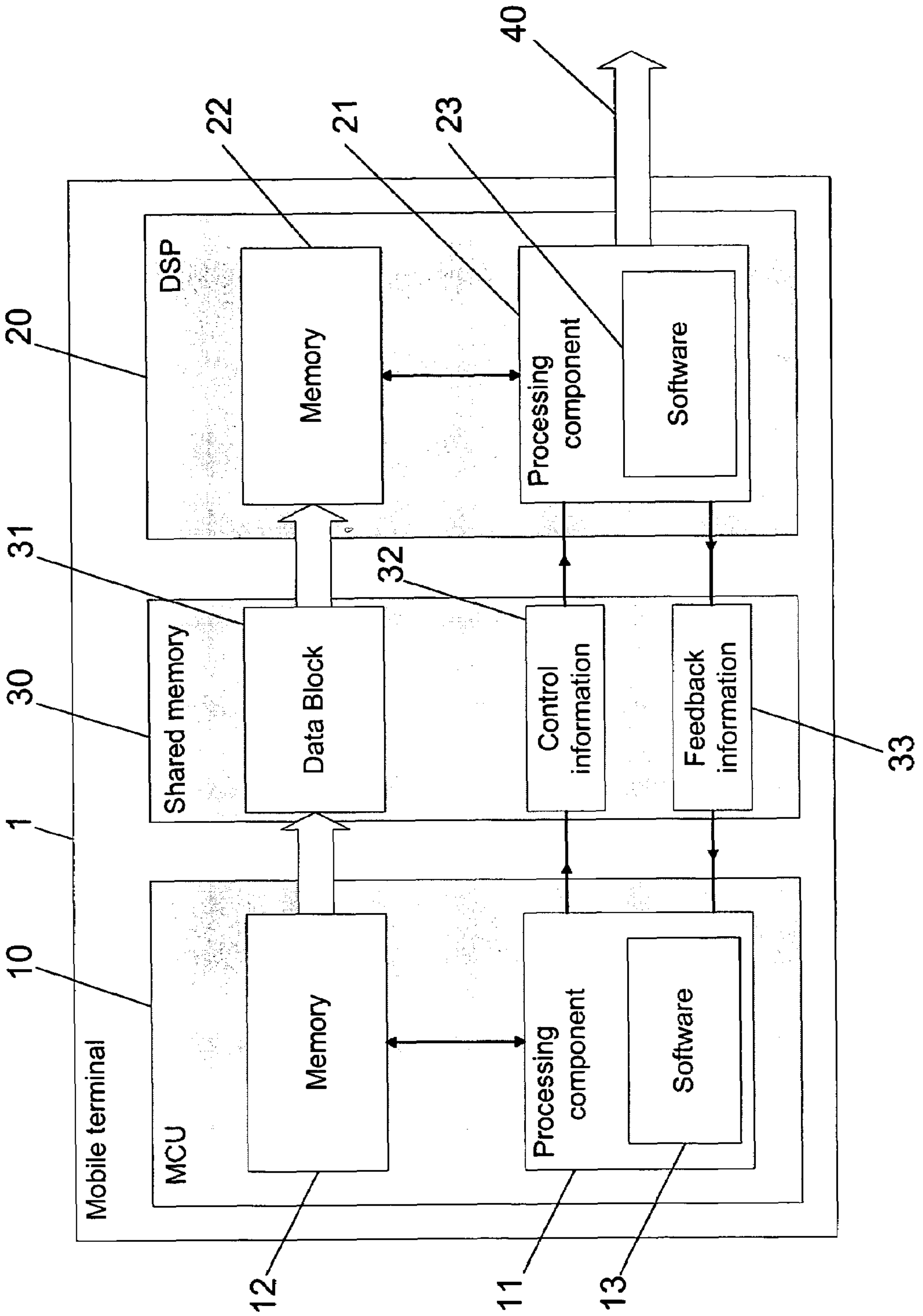
FIG. 1 is a schematic block diagram of a wavetable based sound synthesizing system in which the invention can be implemented.

FIG. 1 schematically presents a wavetable based sound synthesizing system according to the invention. The system can be for example a mobile telecommunication terminal 1 or a part of such a terminal and comprises an MCU 10 as a first processor, a DSP 20 as a second processor and a shared memory 30. In this system, raw wavetable data stored in the MCU 10 is streamed through the shared memory 30 from the MCU 10 to the DSP 20 in a way which allows the DSP 20 to produce audio output 40 by means of a wavetable sound synthesis procedure.

The MCU 10 includes to this end a processing component 11 and a memory 12. The DSP 20 comprises equally a processing component 21 and a memory 22. The memory 12 of the MCU 10 is significantly larger than the memory 22 of the DSP 20, while the computational power of the processing component 21 of the DSP 20 is significantly larger than the computational power of the processing component 11 of the MCU 10, as known from conventional mobile telecommunication terminals.

The memory 12 of the MCU 10 stores raw wavetable data, and the processing component 11 of the MCU 10 runs a software 13 supporting the streaming of the raw wavetable data to the shared memory 30, from where it becomes available to the DSP 20 for transfer into memory 22. The software 13 is able to select samples of the stored raw wavetable data which can be expected to be required at the most at the DSP 20 for generating a next audio frame. The processing component 11 selects the samples according to the invention by means of a prediction based on a model for the most likely pitch evolution during one audio frame and on the numbers of raw data samples that the DSP 20 has used so far for producing output audio frames. The software 13 run by the processing component 11 of the MCU writes the selected samples directly into a data block 31 inside the shared memory 30, from where they are transferred at an appropriate time into the memory 22 of the DSP 20. In addition, the software 13 run by the processing component 11 of the MCU writes control information 32 on the provided data block into the shared memory 30. This information will be used at an appropriate time by the processing component 21 of the DSP 20 in order to handle a raw wavetable data block 31 copied from shared memory 30 into the memory 22.

The memory 22 of the DSP 20 stores only those samples at a time which are transferred to it, in a form of a data block 31, from the shared memory 30 by means of a data transfer initiated by the processing component 21 at the beginning of each frame. The software 23 is moreover able to synthesize output audio frames 40 from received raw wavetable data in a known manner. In addition, it is able to determine based on control information 32, received from the processing component 11 of the MCU 10, which samples in the DSP memory 22 are to be used for the respective next audio frame, and to provide feedback information 33 on the actually used number of samples for this next audio frame, into the shared memory 30. The feedback information 33 is read by the processing component 11 of the MCU 10 at the beginning of each frame and it is used to prepare a new data block 31.

Figure 2:
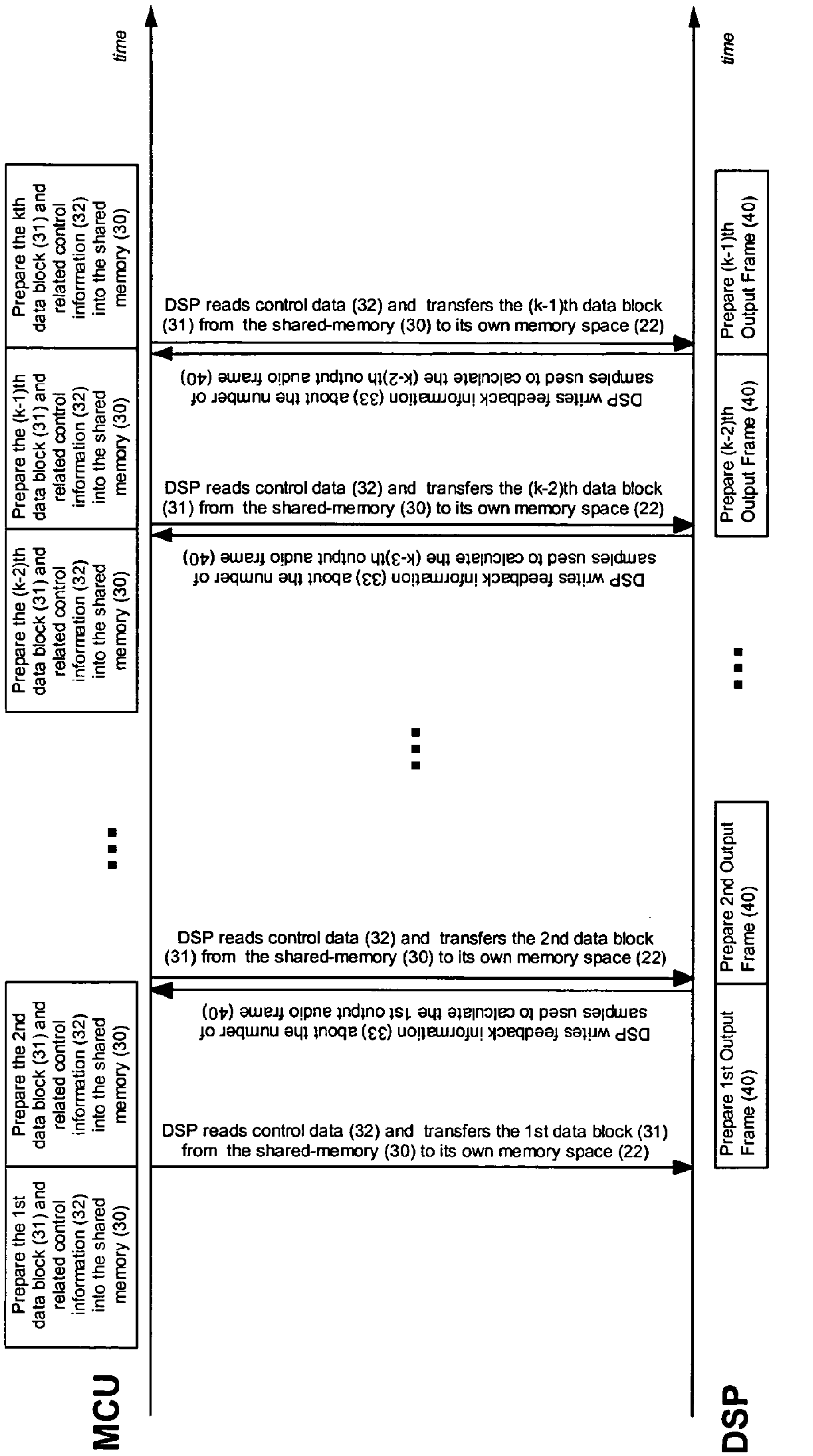
FIG. 2 is a diagram illustrating the temporal evolution of a communication process in the system of FIG. 1.

The MCU 10 and the DSP 20 work independently from each other and communicate only once per frame. The temporal evolution of the communication between the MCU 10 and the DSP 20 is depicted in FIG. 2. The operation at the MCU 10 is represented at the top of FIG. 2, the operation at the DSP 20 is represented at the bottom of FIG. 2, and arrows in between represent the communication between the MCU 10 and the DSP 20 that is carried out through the shared memory 30.

The MCU 10 prepares directly into the shared memory 30 a first data block 31 with raw wavetable data together with the related control information 32 for the DSP 20. Thereafter, it prepares a second data block 31 together with the related control information 32 into the same shared memory 30 for the DSP 20, etc.

Upon receipt of a respective data block, the DSP 20 produces an output audio frame 40 and reports to the MCU how many raw data samples it needed for processing this specific audio frame. This report is done in the form of a feedback data 33 stored in the shared memory 30.

As can be seen in FIG. 2, the DSP 20 reports lag always behind by two frames with respect to the data block the MCU 10 has to prepare next. Thus, when the MCU 10 starts to prepare the $k^{th}$ data block, it may use only the information regarding how many samples the DSP 20 needed for preparing each output audio frame until the $(k-2)^{th}$ frame.

The exact samples the MCU 10 should include into the next data block for enabling the DSP 20 to prepare the next audio frame is not known by the MCU 10. Hence it must be predicted as mentioned above with reference to FIG. 1. As any such prediction is subject to a certain error, a mechanism is presented which allows to compensate for this error and thus to cancel its potential effect onto the output sound.

In case an insufficient number of raw data samples is transmitted from the MCU 10 to the DSP 20, the output frame would have to be completed with some neutral values, once the available raw data samples received from the MCU 10 have been consumed.

In order to prevent such an error, the MCU 10 must always submit to the DSP 20 a larger number of samples than the DSP 20 is expected to process for a specific audio frame. Consequently, the data blocks submitted by the MCU 10 to the DSP 20 will usually be overlapping to some degree. A corresponding block based streaming of a wavetable data array from the MCU 10 to the DSP 20 is illustrated in FIG. 3.

Figure 3:
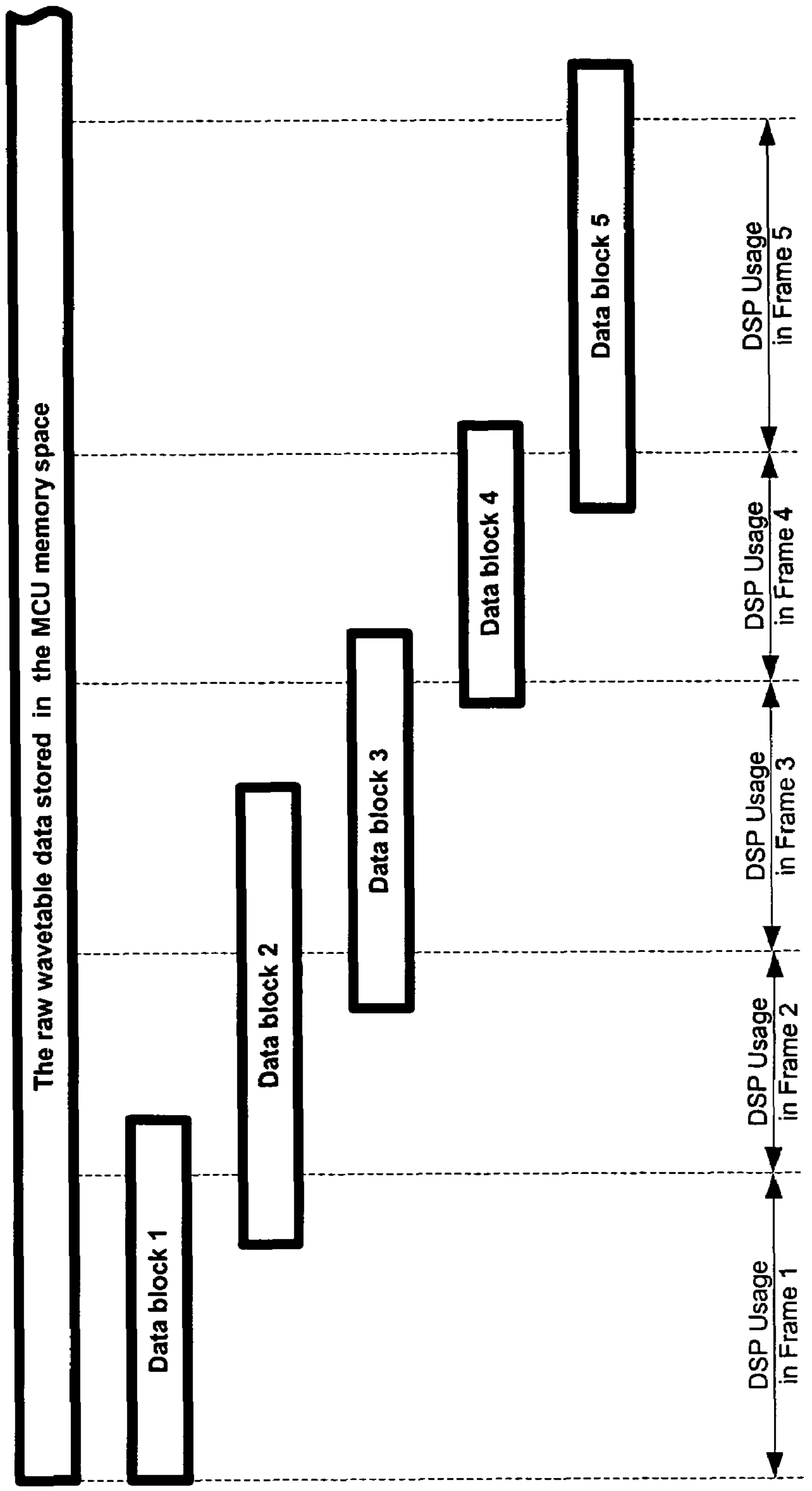
FIG. 3 is a diagram illustrating the block based streaming of wavetable data in the system of FIG. 1.

FIG. 3 shows at the top a horizontal beam representing the raw wavetable data array in the memory 12 of the MCU 10 and at the bottom a sequence of double-headed arrows indicating the amount of wavetable samples used by the DSP 20 for a respective output audio frame 1 to 5. In between, data blocks 1 to 5, which are transmitted in sequence by the MCU 10 to the DSP 20, are presented in form of shorter horizontal beams. A distinct data block is provided for each audio frame. The samples in the data blocks correspond to the samples in the wavetable data array at the same vertical position. In order to ensure that sufficient samples are available for each audio frame 1 to 5, the samples in the data blocks 1 to 5 are overlapping. As a result, the size of each data block exceeds normally the size required in the DSP 20 for the corresponding output audio frame. At the same time, the size of data blocks should not be too large because of the limited DSP memory 22.

A streaming mechanism will now be presented, which is suited to find a compromise between the requirements of a sufficiently large number of samples for the preparation of an audio frame and a sufficiently small number of samples for the storage in the shared memory 30 as well as in the memory 22 of the DSP 20.

Figure 4:
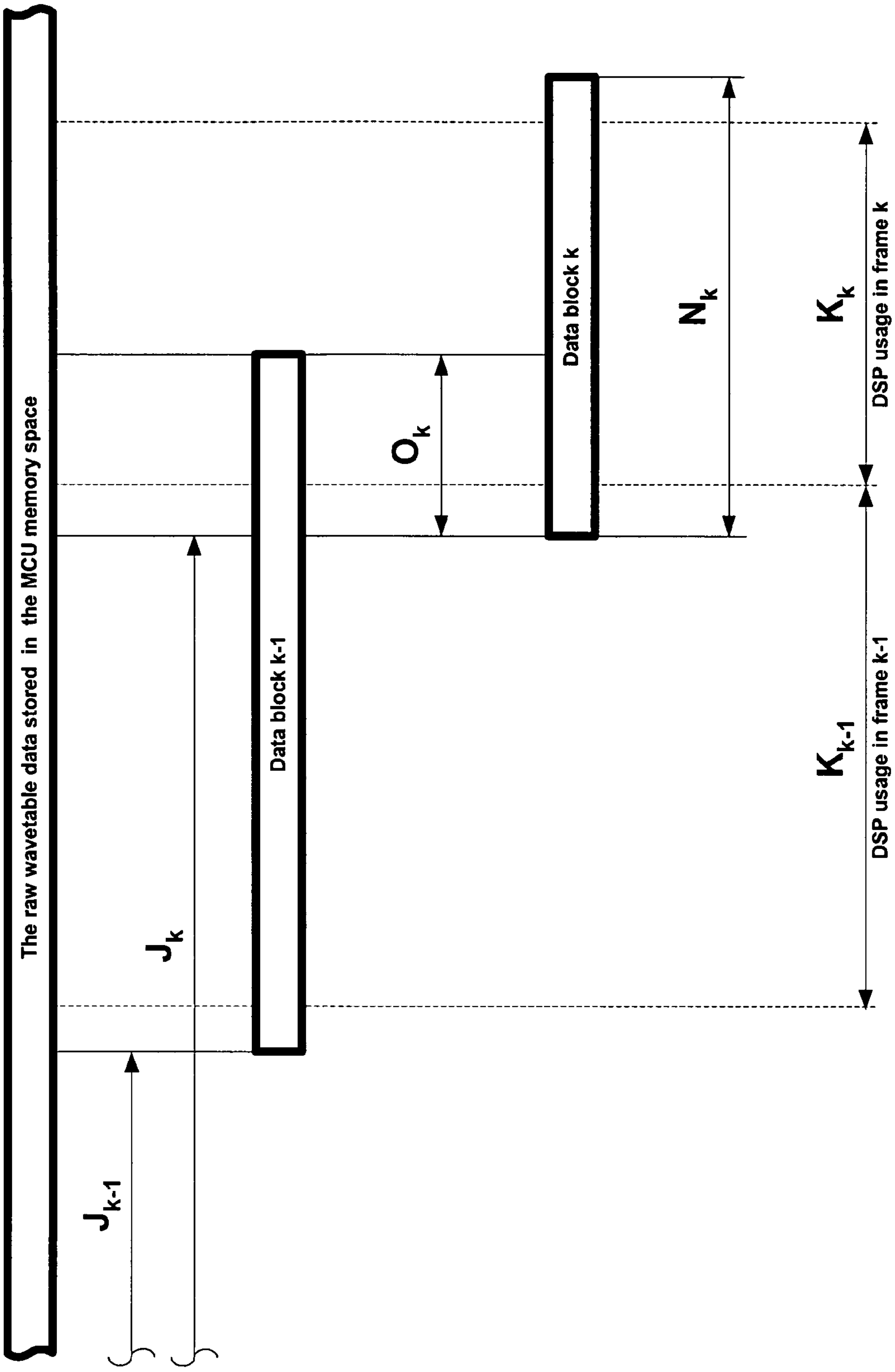
FIG. 4 is a diagram illustrating the main notations used for describing an embodiment of the invention.

FIG. 4 illustrates some notations that will be used in the following for describing the streaming mechanism.

Similarly as FIG. 3, FIG. 4 shows at the top a beam representing a portion of the raw wavetable data stored in the memory 12 of the MCU 10 and at the bottom a sequence of two double-headed arrows indicating the amount of samples used by the DSP 20 for a respective output frame $k-1$ and $k$. In between, overlapping data blocks $k-1$ and $k$, which are transmitted in sequence by the MCU 10 to the DSP 20, are presented.

In this diagram, $J_k$ is the index of the first wavetable sample that shall be submitted to the DSP 20 in the $k^{th}$ data block. $O_k$ is the number of wavetable samples common to the $k^{th}$ and the $(k-1)^{th}$ data block. $N_k$ is the number of wavetable samples included into the $k^{th}$ data block provided by the MCU 10. And $K_k$ is the number of wavetable samples used by the DSP 20 in order to produce the $k^{th}$ output audio frame.

Estimates for the number of wavetable samples needed by DSP 20 for audio frames $k-1$ and $k$ are to be determined by the MCU 10 based on an underlying model of the pitch-shift during one frame and on the number of wavetable samples that has been used by the DSP 20 for each output audio frame until the frame k−2. Because any such estimate can be subject to errors, lower and upper bounds for the possible number of samples will be used to decide which wavetable samples should be sent to the DSP 20 in one data block.

For such upper and lower bounds, the following notations are employed: $L_{k-1}$ is the lower bound of the number of samples $K_{k-1}$ of the $(k-1)^{th}$ data block. $U_{k-1}$ is the upper bound of $K_{k-1}$. $UU_k$ is the upper bound of the number of samples $K_k$ of the $k^{th}$ data block. All three bounds $L_{k-1}$, $U_{k-1}$ and $UU_k$, are estimated based at least on the underlying model for pitch variation, and possibly in addition, depending on the selected model, on the DSP usage history until audio frame k−2.

In order to ensure that all raw data samples of the stored wavetable data are send to the DSP 20 in one of the data blocks and that there is no jumping over samples, the index $J_k$ of the first data sample for each data block k should be as small as possible. The index can thus be calculated according to the following formula:

$$J_k = K_1 + K_2 + \ldots + K_{k-2} + L_{k-1}. \quad (1)$$

The numbers $K_1$ to $K_{k-2}$ may be summarized in a sum $S_k$.

In order to ensure that a sufficient number of samples is submitted in the $k^{th}$ data block to the DSP 20, the size $N_k$ of the data block must be chosen as large as possible. The size can thus be calculated according to the following formula:

$$N_k = UU_k + U_{k-1} - L_{k-1}. \quad (2)$$

Finally, the number of overlapping samples between the $k^{th}$ and the $(k-1)^{th}$ data block can be determined according to the following formula:

$$O_k = N_{k-1} + J_{k-1} - J_k. \quad (3)$$

Equations (1) to (3) result in three values which can be used by a streaming algorithm for each audio output frame k, where k>2.

Figure 5:
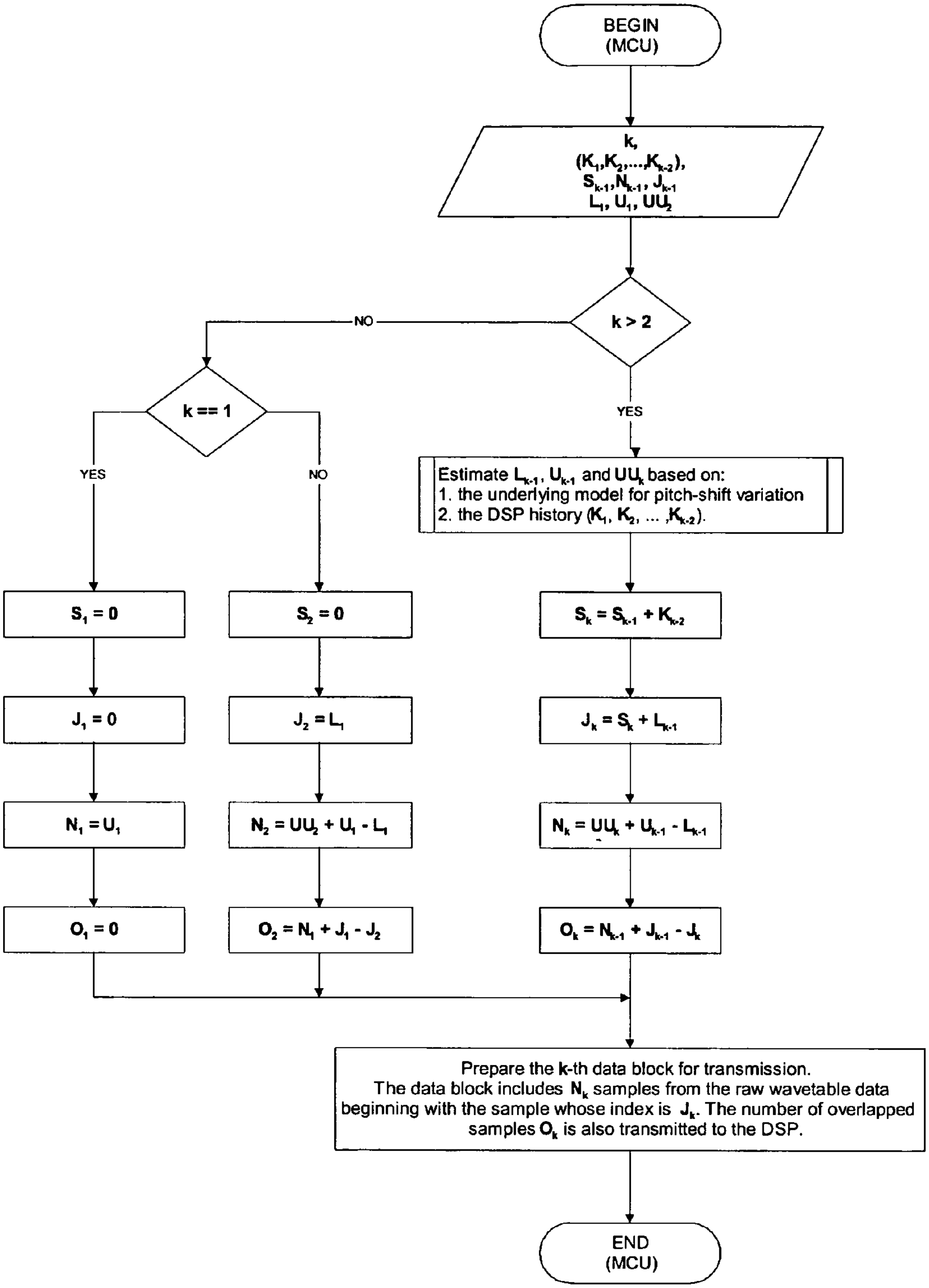
FIG. 5 is a flow chart illustrating the procedure carried out by an MCU in the system of FIG. 1.
Figure 6:
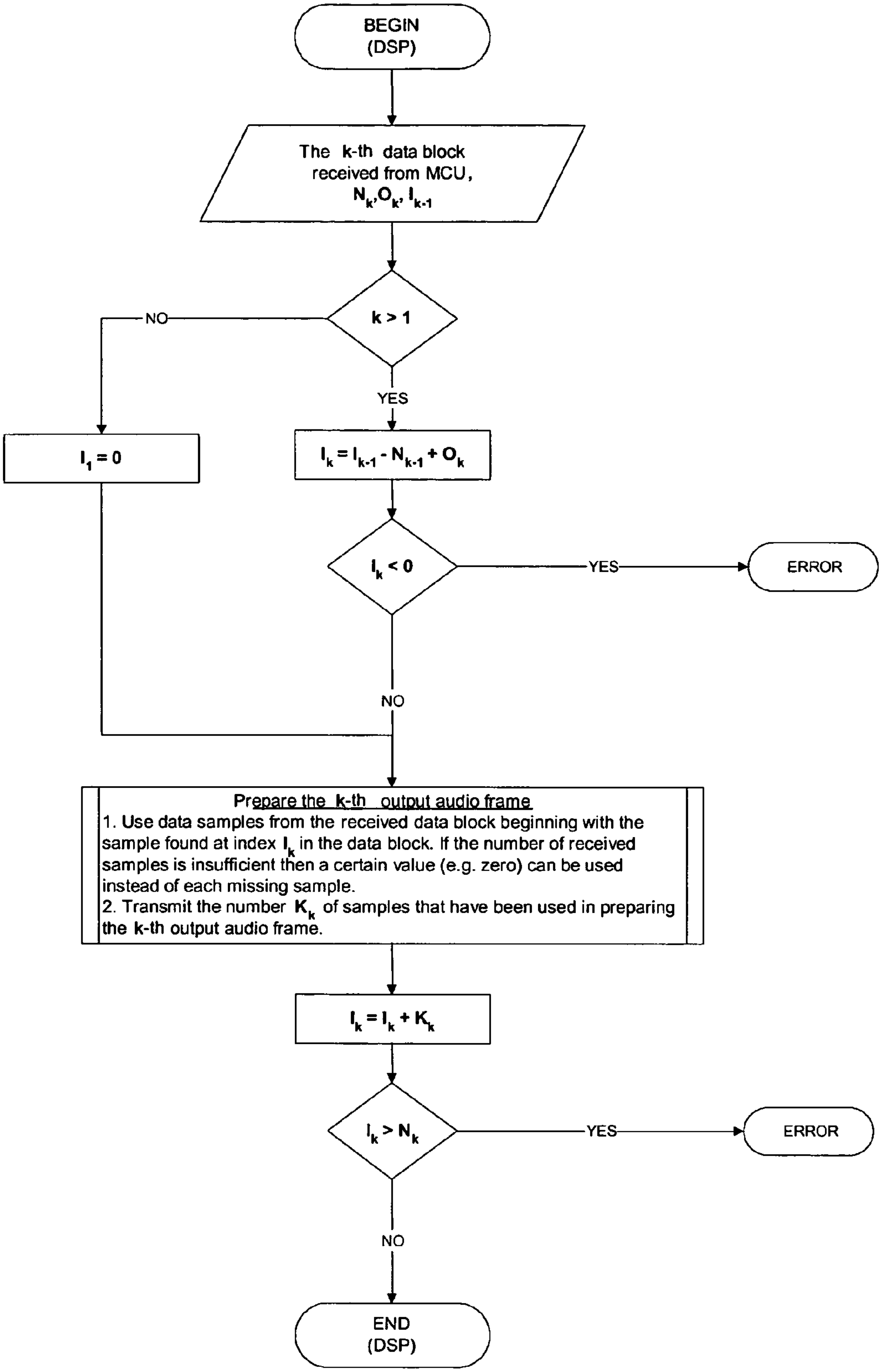
FIG. 6 is a flow chart illustrating the procedure carried out by a DSP in the system of FIG. 1.

The use of the formulas in a streaming mechanism is presented in a general form in the flow charts of FIGS. 5 and 6.

The operations carried out by the MCU processing component 11 are illustrated in FIG. 5.

At the beginning of the data transfer, the MCU 10 has to prepare a first data block for the first output audio frame which is to be prepared by the DSP 20. It is assumed that the lower and upper bounds $L_1$ and $U_1$ for the first audio frame and the upper bounds $UU_2$ for the second audio frame are known a priori at the MCU 10. Alternatively, they could be estimated by the MCU 10 based on an underlying model for pitch-shift variation.

For the first data block, the MCU 10 sets an auxiliary sum $S_1$ and the index $J_1$ to zero, the number of samples for the first data block $N_1$ to the upper bound $U_1$, and the number of overlapping samples $O_1$ equally to zero. Then, the MCU 10 prepares the first data block for transmission. The data block includes $N_1$ samples from the raw wavetable data stored in the MCU memory 12 beginning with the very first sample having the index $J_1=0$. The prepared data block is then provided to the DSP 20 via the shared memory space 30 together with the number of samples $N_1$ and the determined number of overlapping samples $O_1=0$.

For the second data block comprising the samples for the second output audio frame which is to be prepared by the DSP 20, the MCU 10 sets the auxiliary sum $S_2$ again to zero and the index $J_2$ to $L_1$. Further, the MCU 10 determines the number of samples for the second data block $N_2$ and the number of overlapping samples $O_2$ in accordance with above equations (2) and (3). Then, the MCU 10 prepares the second data block for transmission. The data block includes $N_2$ samples from the raw wavetable data stored in the MCU memory 12 beginning with the sample having the index $J_2$. The prepared data block is then provided to the DSP 20 via the shared memory space 30 together with the number of samples $N_2$ and the determined number of overlapping samples $O_1$.

For any further data block k, the MCU 10 first estimates bounds $L_{k-1}$, $U_{k-1}$ for the $(k-1)^{th}$ audio frame and bound $UU_k$ for the $k^{th}$ audio frame based on the underlying model for pitch-shift variation, and possibly in addition on the DSP history, that is on the values $K_1$, $K_2$ to $K_{k-2}$. The value $K_{k-2}$ is provided for each data block k by the DSP 20, as will be described below with reference to FIG. 6.

Then, the auxiliary sum $S_k=S_{k-1}+K_{k-2}$ is calculated. The calculated sum $S_k$ thus represents the sum $K_1+K_2+\ldots+K_{k-2}$. Thereupon, the index $J_k$ is calculated according to above equation (1) making use of the auxiliary sum $S_k$. In addition, the MCU 10 determines the number of samples for the $k^{th}$ data block $N_k$ and the number of overlapping samples $O_k$ in accordance with above equations (2) and (3).

Now, the MCU 10 prepares the $k^{th}$ data block for transmission. The data block includes $N_k$ samples from the raw wavetable data stored in the MCU memory 12 beginning with the sample having the index $J_k$. The prepared data block is provided to the DSP 20 via the shared memory space 30 together with the number of samples $N_k$ and the determined number of overlapping samples $O_k$.

The operations carried out by the DSP processing component 21 are illustrated in FIG. 6.

At the beginning, the DSP 20 receives the first data block k=1, the number of samples $N_1$ and the determined number of overlapping samples $O_1$ from the MCU 10 via the shared memory space 30. Further, it sets a local variable $I_1$ to zero.

Then, the DSP 20 prepares the first output audio frame. It processes to this end data samples from the received first data block beginning at index $I_1=0$ in the data block, that is, with the very first sample. The actual preparation of the audio frame is carried out in a known manner by means of a wavetable sound synthesis, including for example pitch shifting operations. If the number of samples in the first data block is insufficient for preparing the first audio frame, a certain value, for example zero, might be used instead of each missing sample. The DSP 20 records the number $K_1$ of samples that have been used in the preparation of the first output audio frame and provides this number $K_1$ to the MCU 10 via the shared memory space 30.

Thereafter, the value of the variable $I_1$ is increased by the number $K_1$. If the new value $I_1$ is larger than the total number of received samples $N_1$ in the first data block, some samples have been missing for preparing the first audio frame, thus there is an error in the playback.

For any subsequent output audio frame k, the DSP 20 receives from the MCU 10 via the shared memory space 30 the $k^{th}$ data block, the number of samples $N_k$ in this data block and the number $O_k$ of overlapping samples. The DSP 10 first sets the local variable $I_k$ according to the formula $I_k=I_{k-1}-N_{k-1}+O_k$. The resulting value indicates an index in the $k^{th}$ data block beginning from which samples are to be used for preparing the $k^{th}$ audio frame, since the samples at smaller indices have already been used for a preceding output audio frame. If the variable $I_k$ has a value smaller than zero, this means that some samples are lost, which implies an error in the playback.

The DSP 20 then prepares the $k^{th}$ output audio frame. It processes to this end data samples from the received $k^{th}$ data block beginning at the determined index $I_k$ in the data block. The actual preparation of the audio frame is carried out in a known manner by means of a wavetable sound synthesis. If the number of samples in the $k^{th}$ data block is insufficient for preparing the $k^{th}$ audio frame, a certain value, for example zero, might be used instead of each missing sample. The DSP 20 records the number $K_k$ of samples that have to be used in the preparation of the $k^{th}$ output audio frame and provides this number $K_k$ via the shared memory space 30 to the MCU 10.

Thereafter, the value of the variable $I_k$ is increased by the number $K_k$. If the new value $I_k$ is larger than the total number of received samples $N_k$ in the $k^{th}$ data block, some samples have been missing for preparing the frame, thus there is an error in the playback.

Variations of the algorithm illustrated in FIGS. 5 and 6 can be obtained by varying the model of the pitch-shift variation during one frame, which is employed at the MCU side of the streaming algorithm for determining the upper and lower bounds of audio frames. The operation on the DSP side may remain unchanged regardless of the underlying model of the pitch-shift variation.

The model for pitch shift variation in FIG. 5 should be selected such that it minimizes errors due to lost samples or due to missing samples resulting from a misjudgment on the MCU side.

Figure 7:
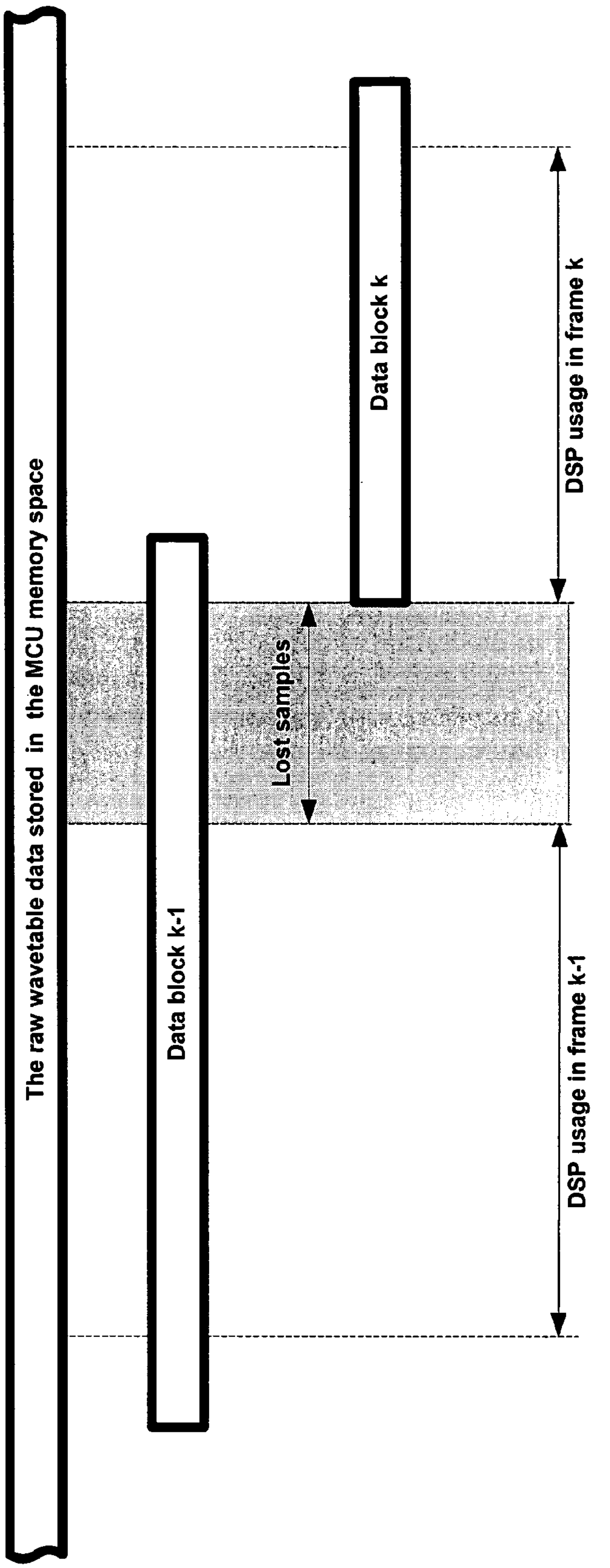
FIG. 7 is a diagram illustrating an error due to overestimation of required wavetable samples.

FIG. 7 illustrates an error scenario resulting if the MCU 10 overestimates the number of samples the DSP 20 will need in order to prepare an output audio frame.

A beam at the top of FIG. 7 represents again a portion of the raw wavetable data stored in the memory 12 of the MCU 10. Further, two subsequently transmitted data blocks k−1 and k are depicted in form of two overlapping shorter beams below the represented portion of the raw wavetable data. At the bottom, two subsequent double-headed arrows indicate the amount of wavetable samples needed by the DSP 20 in the preparation of audio frames k−1 and k.

As can be seen, the DSP 20 receives enough wavetable samples with the $(k-1)^{th}$ data block for preparing the $(k-1)^{th}$ output audio frame. However, since the DSP reports are always two frames behind, as mentioned above with reference to FIG. 2, the MCU 10 has to estimate how many samples the DSP 20 has processed in audio frame k−1, in order to know which samples must be retransmitted again in the $k^{th}$ data block for the $k^{th}$ audio frame. At this point, according to the figure, the MCU commits an error, since it overestimates the number of samples used by the DSP in frame k−1. It thus selects a starting index $J_k$ for the samples in the $k^{th}$ data block which is too high. As a result, several samples from the wavetable data required for the preparation of the $k^{th}$ audio frame will not be included in the $k^{th}$ data block and are actually lost. The lost samples for audio frame k are indicated with a gray section.

Figure 8:
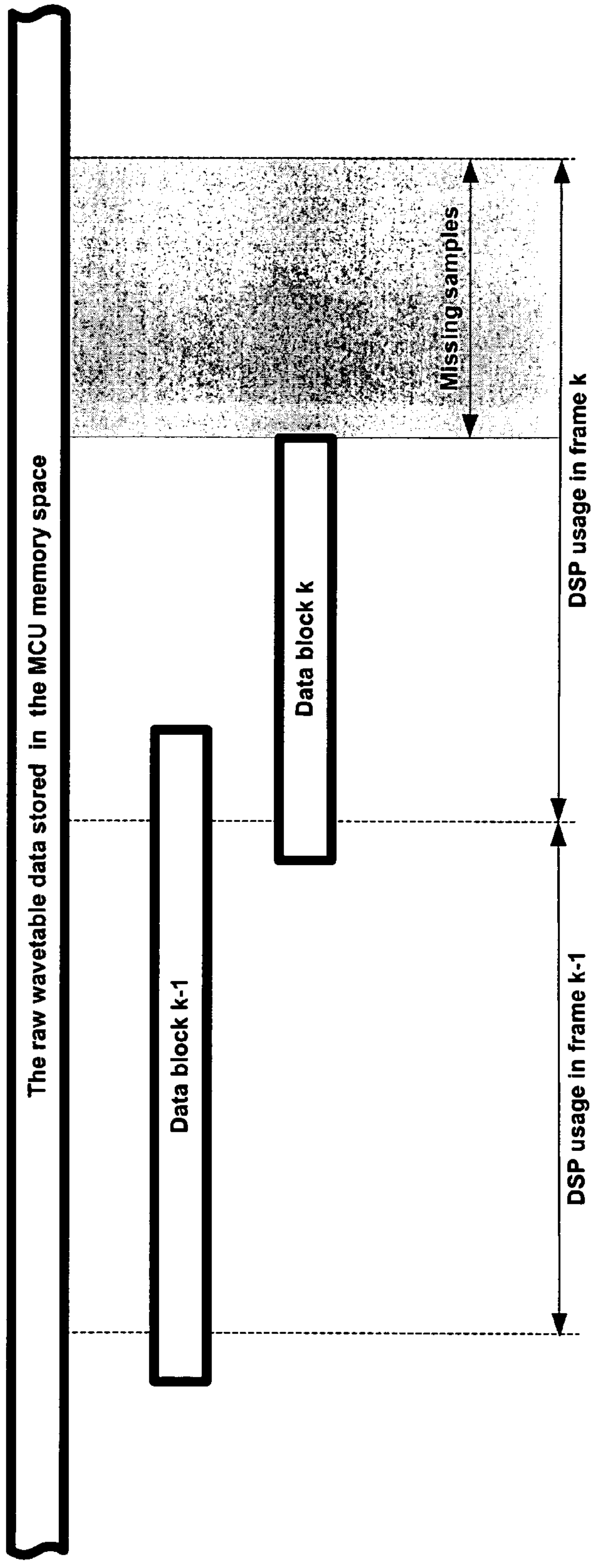
FIG. 8 is a diagram illustrating an error due to underestimation of required wavetable samples.

FIG. 8 illustrates an error scenario resulting if the MCU 10 underestimates the number of samples the DSP 20 will need in order to prepare an output audio frame.

A beam at the top of FIG. 8 represents again a portion of the raw wavetable data stored in the memory 12 of the MCU 20. Further, two subsequently transmitted data blocks k−1 and k are depicted in form of two overlapping shorter beams below the represented portion of the raw wavetable data. At the bottom, two subsequent double-headed arrows indicate the amount of wavetable samples needed by the DSP 20 in the preparation of audio frames k−1 and k.

In this case, the wavetable samples of the $k^{th}$ data block start off with a sufficiently low index $J_k$. But the $k^{th}$ data block turns out to be too small such that, at some point, the DSP 20 will run out of samples during the preparation of the $k^{th}$ audio frame. The missing samples for frame k are indicated with a gray section. The DSP 20 might thus be forced to replace the missing samples with some neutral value, e.g. using a zero padding.

The two scenarios presented in FIGS. 7 and 8 show that it is as bad to overestimate the number of required raw data samples as it is to underestimate the number of raw data samples which the DSP 20 will need to prepare an output audio frame. The streaming algorithm must therefore be designed such that it avoids either one of these two situations.

In the following, two simple examples of a model for pitch evolution are presented, which may be employed in the algorithm of FIG. 6.

In a first example, the model for pitch evolution is selected such that the number of samples needed by the DSP 20 is assumed to lie always between two positive integer values m and M, where m<M. In this model, the bounds for the first two audio frames required by the MCU 10 for the first two data blocks are $L_1$=m, $U_1$=M, and $UU_2$=M. Next, the estimates for the lower and upper bounds for the subsequent frames are $L_2$=m, $L_{k-1}$=m, $U_{k-1}$=M, and $UU_k$=M, where k>2.

In a second example, the model for pitch evolution imposes certain lower and upper bounds for the average amount of pitch-shift that may take place during a single audio frame. The average pitch-shift during one frame is assumed to be between −d and +d octaves. Denoting by F the number of samples in an output audio frame, the bounds for the first two audio frames are $L_1=\text{floor}(2^{-d}F)$, $U_1=\text{ceil}(2^{d}F)$, and $UU_2=\text{ceil}(2^{2d}F)$, where floor() and ceil() are well known functions that truncates their argument to the closest integer either towards minus or plus infinity, respectively. For audio frames k>2, the estimates for the lower and upper bounds are $L_{k-1}=\text{floor}(2^{-d}K_{k-2})$, $U_{k-1}=\text{ceil}(2^{d}K_{k-2})$, and $UU_k=\text{ceil}(2^{2d}K_{k-2})$, and the lower bound for the second audio frame is $L_2=\text{floor}(2^{-d}F)$.

While there have been shown and described and pointed out fundamental novel features of the invention as applied to a preferred embodiment thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method comprising:

a first processor selecting samples of stored wavetable data, which samples are expected to be required at the most at a second processor for generating a respective next output audio frame, said selection being based on a given model of a pitch-shift evolution during a single frame and on the number of samples which have been used so far by said second processor during a generation of preceding audio frames, making said selected samples available to said second processor, and said second processor generating at least an output audio signal frame-by-frame based on said selected samples.

2. The method according to claim 1, wherein for a first output audio frame of said output audio signal, a number $N_1$ of to be selected samples is determined by said first processor to be equal to a predetermined upper bound $U_1$ for the number of samples needed for generating said first output audio frame, and wherein samples of said determined number $N_1$ are selected from said stored wavetable data starting off at an index $J_1$ of zero, said selected samples for said first output audio frame being made available first to said second processor.

3. The method according to claim 2, wherein for a second output audio frame of said output audio signal, the number $N_2$ of to be selected samples is determined by said first processor to be equal to the sum of said predetermined upper bound $U_1$ for the number of samples needed for generating said first output audio frame and a predetermined upper bound $UU_2$ for the number of samples needed for generating said second output audio frame, decremented by a predetermined lower bound $L_1$, for the number of samples needed for generating said first output audio frame, and wherein samples of said determined number $N_2$ are selected from said stored wavetable data starting off at an index $J_2$ corresponding to said lower bound $L_1$, said selected samples for said second output audio frame being made available secondly to said second processor.

4. The method according to claim 1, wherein selecting said samples for a $k^{th}$ output audio frame as next output audio frame, with k greater than 2, comprises: estimating a lower bound $L_{k-1}$ for the number of samples needed for generating a $(k-1)^{th}$ audio frame, based at least on said given model of a pitch-shift evolution during a single frame; estimating a first upper bound $U_{k-1}$ for the number of samples needed for generating said $(k-1)^{th}$ audio frame, based at least on said given model of a pitch-shift evolution during a single frame; estimating a second upper bound $UU_k$ for the number of samples needed for generating said $k^{th}$ output audio frame based at least on said given model of a pitch-shift evolution during a single frame; determining an index $J_k$ identifying a first one of said to be selected samples as the sum of the number $K_1$ to $K_{k-2}$ of samples needed for generating all preceding output audio frames but the last, incremented by said estimated lower bound $L_{k-1}$; determining the number $N_k$ of said to be selected samples as the sum of said estimated first upper bound $U_{k-1}$ and said estimated second upper bound $UU_k$, decremented by said estimated lower bound $L_{k-1}$; and selecting samples of said determined number $N_k$ from said wavetable data starting off at said determined index $J_k$.

5. The method according to claim 1, further comprising at said first processor determining the number $O_k$ of samples of said selected samples for a next output audio frame which overlap with samples selected for a last preceding output audio frame, and making said determined number $O_k$ of overlapping samples available to said second processor.

6. The method according to claim 1, said method comprising at said second processor: receiving samples of said wavetable data for a $k^{th}$ output audio frame which is to be generated next, with k greater than 0, which samples are made available by said first processor; determining an index $I_k$ identifying a first sample among said received samples which has not been used for generating a $(k-1)^{th}$ output audio frame; processing said received samples, beginning with said first sample identified by said determined index $I_k$, for generating said $k^{th}$ output audio frame; and making the number $K_k$ of samples required in generating said $k^{th}$ output audio frame available to said first processor.

7. The method according to claim 6, wherein for determining said index $I_k$, said second processor evaluates the number $O_k$ of overlapping samples received for the $(k-1)^{th}$ output audio frame and for the $k^{th}$ output audio frame, an indication of said number $O_k$ of overlapping samples being made available to said second processor by said first processor.

8. The method according to claim 6, further comprising at said second processor determining whether those samples following in said stored wavetable data immediately upon a last sample used for generating said $(k-1)^{th}$ output audio frame are included in said received samples for said $k^{th}$ output audio frame, and if this is not the case, using a predetermined value for each of said samples not included in said received samples before using said received samples for generating said $k^{th}$ output audio frame.

9. The method according to claim 6, wherein in case generating said $k^{th}$ output audio frame requires more samples than said received samples beginning with said sample identified by said determined index $I_k$, said second processor uses a predetermined value for each missing sample.

10. The method according to claim 6, wherein for a first output audio frame of said output audio signal, said index $I_1$ is determined to be equal to zero.

11. A method comprising:

receiving in a second processor samples of stored wavetable data for a $k^{th}$ output audio frame which is to be generated next, with k greater than 0, which samples are made available to said second processor by a first processor so that said second processor generates an output audio signal frame-by-frame based on said samples of said wavetable data;

said second processor determining an index $I_k$ identifying a first sample among said received samples which has not been used for generating a $(k-1)^{th}$ output audio frame;

said second processor processing said received samples, beginning with said first sample identified by said determined index $I_k$, for generating said $k^{th}$ output audio frame; and said second processor making the number $K_k$ of samples required in generating said $k^{th}$ output audio frame available to said first processor.

12. A processor providing wavetable data to another processor, said processor comprising:

a memory for storing said wavetable data; and a processing component selecting samples of said stored wavetable data, which samples are expected to be required at the most at said other processor for generating a respective next output audio frame, said selection being based on a given model of a pitch-shift evolution during a single frame and on the number of samples which have been used so far by said other processor during a generation of preceding audio frames, said processing component further making said selected samples available to said other processor for sound synthesis based on said selected samples of said stored wavetable data.

13. The processor according to claim 12, wherein said processor is a micro controller unit.

14. A processor receiving wavetable data from another processor, said processor comprising:

a memory and a processing component for generating an output audio signal frame-by-frame based on samples of said wavetable data, which processing component receives samples of said wavetable data for a $k^{th}$ output audio frame which is to be generated next, with k greater than 0, which samples are made available by said other processor;

which processing component determines an index $I_k$ identifying a first sample among said received samples which has not been used for generating a $(k-1)^{th}$ output audio frame;

which processing component processes said received samples, beginning with said first sample identified by said determined index $I_k$, for generating said $k^{th}$ output audio frame; and which processing component makes the number $K_k$ of samples required in generating said $k^{th}$ output audio frame available to said other processor.

15. The processor according to claim 14, wherein said processor is a digital signal processor.

16. Apparatus comprising a first processor for storing wavetable data and a second processor for generating at least an output audio signal frame-by-frame based on samples of said wavetable data, said first processor including:

a memory for storing said wavetable data; and a processing component selecting samples of said stored wavetable data, which samples are expected to be required at the most at said second processor for generating a respective next output audio frame, said selection being based on a given model of a pitch-shift evolution during a single frame and on the number of samples which have been used so far by said second processor during a generation of preceding audio frames, said processing component further making said selected samples available to said second processor; and said second processor including:

a memory for storing samples of wavetable data received from said first processor; and a processing component generating an output audio frame by processing samples from said memory of said second processor.

17. The apparatus according to claim 16, further comprising a shared memory accessible by said first processor and by said second processor, wherein said processing component of said first processor makes said selected samples available to said second processor by writing them into said shared memory, and wherein said processing component of said second processor reads said selected samples from said shared memory and stores said read samples into said memory of said second processor.

18. A device comprising a first processor for storing wavetable data and a second processor for generating at least an output audio signal frame-by-frame based on samples of said wavetable data, said first processor including:

a memory for storing said wavetable data; and a processing component selecting samples of said stored wavetable data, which samples are expected to be required at the most at said second processor for generating a respective next output audio frame, said selection being based on a given model of a pitch-shift evolution during a single frame and on the number of samples which have been used so far by said second processor during a generation of preceding audio frames, said processing component further making said selected samples available to said second processor; and said second processor including:

a memory for storing samples of wavetable data received from said first processor; and a processing component generating an output audio frame by processing samples from said memory of said second processor.

19. The device according to claim 18, further comprising a shared memory accessible by said first processor and by said second processor, wherein said processing component of said first processor makes said selected samples available to said second processor by writing them into said shared memory, and wherein said processing component of said second processor reads said selected samples from said shared memory and stores said read samples into said memory of said second processor.

20. A software program product comprising a computer readable medium in which a software code for supporting a wavetable based sound synthesis is stored, said software code realizing the following method when running in a processing component of a processor storing wavetable data:

selecting samples of said stored wavetable data, which samples are expected to be required at the most at another processor for generating a respective next output audio frame, said selection being based on a given model of a pitch-shift evolution during a single frame and on the number of samples which have been used so far by said other processor during a generation of preceding audio frames; and making said selected samples available to said other processor.

21. A software program product comprising a computer readable medium in which a software code for supporting a wavetable based sound synthesis is stored, said software code realizing the following steps when running in a processing component of a processor for generating at least an output audio signal frame-by-frame based on received samples of wavetable data:

determining an index $I_k$ identifying a first sample among received samples, which first sample has not been used for generating a $(k-1)^{th}$ output audio frame, wherein said received samples are samples of said wavetable data for a $k^{th}$ output audio frame which is to be generated next, with k greater than 0;

processing said received samples, beginning with said first sample identified by said determined index $I_k$, for generating said $k^{th}$ output audio frame; and making the number $K_k$ of samples required in generating said $k^{th}$ output audio frame available to another processor providing said received samples.

* * * * *